United States Patent
Jiang et al.

(10) Patent No.: US 11,900,640 B2
(45) Date of Patent: Feb. 13, 2024

(54) METHOD AND APPARATUS FOR SUBSTITUTIONAL NEURAL RESIDUAL COMPRESSION

(71) Applicant: TENCENT AMERICA LLC, Palo Alto, CA (US)

(72) Inventors: Wei Jiang, San Jose, CA (US); Wei Wang, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 426 days.

(21) Appl. No.: 17/236,108

(22) Filed: Apr. 21, 2021

(65) Prior Publication Data

US 2022/0020182 A1    Jan. 20, 2022

Related U.S. Application Data

(60) Provisional application No. 63/052,242, filed on Jul. 15, 2020.

(51) Int. Cl.
| | |
|---|---|
| *H04N 19/172* | (2014.01) |
| *G06T 9/00* | (2006.01) |
| *G06T 3/40* | (2006.01) |
| *H04N 19/137* | (2014.01) |
| *G06N 3/08* | (2023.01) |
| *H04N 19/149* | (2014.01) |
| *G06N 3/045* | (2023.01) |

(52) U.S. Cl.
CPC ............ *G06T 9/002* (2013.01); *G06N 3/045* (2023.01); *G06N 3/08* (2013.01); *G06T 3/4046* (2013.01); *H04N 19/137* (2014.11); *H04N 19/149* (2014.11); *H04N 19/172* (2014.11)

(58) Field of Classification Search
None
See application file for complete search history.

(56) References Cited

U.S. PATENT DOCUMENTS

| 6,167,155 A * | 12/2000 | Kostrzewski ........... G06T 9/001 348/700 |
| 10,771,807 B1 | 9/2020 | Ulaganathan et al. |
| 11,582,470 B2 * | 2/2023 | Jiang ..................... H04N 19/30 |

(Continued)

OTHER PUBLICATIONS

Johannes Balle et al., "End-To-End Optimized Image Compression", Published as a conference paper at ICLR 2017, 2017, 27 pages, cite as arXiv:1611.01704v3 [cs.CV].

(Continued)

*Primary Examiner* — Tsung Yin Tsai
(74) *Attorney, Agent, or Firm* — Sughrue Mion, PLLC

(57) ABSTRACT

A method of substitutional neural residual compression is performed by at least one processor and includes estimating motion vectors, based on a current image frame and a previous reconstructed image frame, obtaining a predicted image frame, based on the estimated motion vectors and the previous reconstructed image frame, and subtracting the obtained predicted image frame from the current image frame to obtain a substitutional residual. The method further includes encoding the obtained substitutional residual, using a first neural network, to obtain an encoded representation, and compressing the encoded representation.

20 Claims, 7 Drawing Sheets

(56) References Cited

U.S. PATENT DOCUMENTS

| | | | |
|---|---|---|---|
| 2001/0028743 A1* | 10/2001 | Kostrzewski | G06T 9/001 |
| | | | 382/232 |
| 2004/0045030 A1* | 3/2004 | Reynolds | H04L 65/612 |
| | | | 725/110 |
| 2011/0211036 A1* | 9/2011 | Tran | G06F 3/005 |
| | | | 348/E7.083 |
| 2019/0171935 A1 | 6/2019 | Agrawal et al. | |
| 2019/0306526 A1 | 10/2019 | Cho et al. | |
| 2020/0051206 A1* | 2/2020 | Munkberg | G06T 1/20 |
| 2020/0065653 A1* | 2/2020 | Meier | G06V 40/103 |
| 2020/0126191 A1 | 4/2020 | Munkberg et al. | |
| 2020/0145661 A1* | 5/2020 | Jeon | H04N 19/184 |
| 2020/0311870 A1* | 10/2020 | Jung | G06T 3/4053 |

OTHER PUBLICATIONS

International Search Report dated Aug. 31, 2021 in Application No. PCT/US21/34472.

Written Opinion of the International Searching Authority dated Aug. 31, 2021 in Application No. PCT/US21/34472.

Extended European Search Report dated Oct. 20, 2022 in European Application No. 21842157.6.

Eirikur Agustsson et al, "Scale-space flow for end-to-end optimized video compression", 2020 IEEE/CVF Conference on Computer Vision and Pattern Recognition (CVPR), 2020, pp. 8500-8509 (10 pages total).

Wei Wang et al., "Substitutional Neural Image Compression", International Organisation for Standardisation Organisation Internationale De Normalisation ISO/IEC JTC1/SC29/WG11 Coding of Moving Pictures and Audio, ISO/IEC JTC1/SC29/WG11I MPEG2020/M54739, Jun. 2020 (7 pages total).

Xiao Wang et al., "Substitutional Neural Image Compression", Cornell University Library, 2021 (8 pages total).

* cited by examiner

METHOD AND APPARATUS FOR SUBSTITUTIONAL NEURAL RESIDUAL COMPRESSION

CROSS-REFERENCE TO RELATED APPLICATION

This application is based on and claims priority to U.S. Provisional Patent Application No. 63/052,242, filed on Jul. 15, 2020, the disclosure of which is incorporated by reference herein in its entirety.

BACKGROUND

Video coding standards, such as the H.264/Advanced Video Coding (H.264/AVC), High-Efficiency Video Coding (HEVC) and Versatile Video Coding (VVC) share a similar (recursive) block-based hybrid prediction/transform framework in which individual coding tools like intra/inter prediction, integer transforms, and context-adaptive entropy coding, are intensively handcrafted to optimize overall efficiency. Spatiotemporal pixel neighborhoods are leveraged for predictive signal construction, to obtain corresponding residuals for subsequent transform, quantization, and entropy coding.

On the other hand, the nature of Deep Neural Networks (DNNs) is to extract different levels of spatiotemporal stimuli by analyzing spatiotemporal information from a receptive field of neighboring pixels. The capability of exploring highly nonlinearity and nonlocal spatiotemporal correlations provide promising opportunity for largely improved compression quality.

SUMMARY

According to embodiments, a method of substitutional neural residual compression is performed by at least one processor and includes estimating motion vectors, based on a current image frame and a previous reconstructed image frame, obtaining a predicted image frame, based on the estimated motion vectors and the previous reconstructed image frame, and subtracting the obtained predicted image frame from the current image frame to obtain a substitutional residual. The method further includes encoding the obtained substitutional residual, using a first neural network, to obtain an encoded representation, and compressing the encoded representation.

According to embodiments, an apparatus for substitutional neural residual compression includes at least one memory configured to store program code, and at least one processor configured to read the program code and operate as instructed by the program code, the program code including estimating code configured to cause the at least one processor to estimate motion vectors, based on a current image frame and a previous reconstructed image frame, first obtaining code configured to cause the at least one processor to obtain a predicted image frame, based on the estimated motion vectors and the previous reconstructed image frame, and subtracting code configured to cause the at least one processor to subtract the obtained predicted image frame from the current image frame to obtain a substitutional residual. The program code further includes encoding code configured to cause the at least one processor to encode the obtained substitutional residual, using a first neural network, to obtain an encoded representation, and compressing code configured to cause the at least one processor to compress the encoded representation.

According to embodiments, a non-transitory computer-readable medium stores instructions that, when executed by at least one processor for substitutional neural residual compression, cause the at least one processor to estimate motion vectors, based on a current image frame and a previous reconstructed image frame, obtain a predicted image frame, based on the estimated motion vectors and the previous reconstructed image frame, subtract the obtained predicted image frame from the current image frame to obtain a substitutional residual, encode the obtained substitutional residual, using a first neural network, to obtain an encoded representation, and compress the encoded representation.

DETAILED DESCRIPTION

This disclosure is related to a method and an apparatus for compressing an input video by learning substitutional residuals in a video coding framework that uses DNN-based residual compression. The learned substitutional residual is a superior alteration of an original residual, by being visually similar to the original residual but better compressed. Also, the method and apparatus herein provide flexibility in controlling a bitrate in DNN-based residual compression.

A video compression framework can be described as follows. An input video x includes image frames $x_1, \ldots, x_T$. In a first motion estimation step, the image frames are partitioned into spatial blocks (e.g., 8×8 squares), and a set of motion vectors $m_t$ between a current image frame $x_t$ and a previous reconstructed image frame $\hat{x}_{t-1}$ ($\hat{x}_{t-1}$ may include a set of previously reconstructed image frames) is computed for each block. Then, in a second motion compensation step, a predicted image frame $\tilde{x}_t$ is obtained by copying corresponding pixels of the previous reconstructed image frame $\hat{x}_{t-1}$ based on the motion vectors $m_t$, and a residual $r_t$ between the original image frame $x_t$ and the predicted image frame $\tilde{x}_t$ can be obtained: $r_t = x_t - \tilde{x}_t$. In a third step, the residual $r_t$ is quantized after a linear transformation like a discrete cosine transform (DCT). DCT coefficients of $r_t$ are quantized to get a better quantization performance. The quantization step provides a quantized value $\hat{y}_t$. Both the motion vectors $m_t$ and the quantized value $\hat{y}_t$ are encoded by entropy coding into bitstreams, which are sent to decoders.

On the decoder side, the quantized value $\hat{y}_t$ is first dequantized through an inverse transformation like an inverse discrete cosine transform (IDCT) with dequantized coefficients, to obtain a recovered residual $\hat{r}_t$. Then, the recovered residual $\hat{r}_t$ is added back to the predicted image frame $\tilde{x}_t$ to obtain a reconstructed image frame $\hat{x}_t = \tilde{x}_t + \hat{r}_t$.

An efficiency of compressing the residual $r_t$ is a factor for video compression performance. DNN-based methods may be used to help residual compression. For example, highly nonlinear transformations instead of linear ones can be learned using a DNN to improve quantization efficiency. Residuals can also be encoded by an End-to-End (E2E) DNN in which a quantized representation is learned directly without an explicit transformation.

Figure 1:
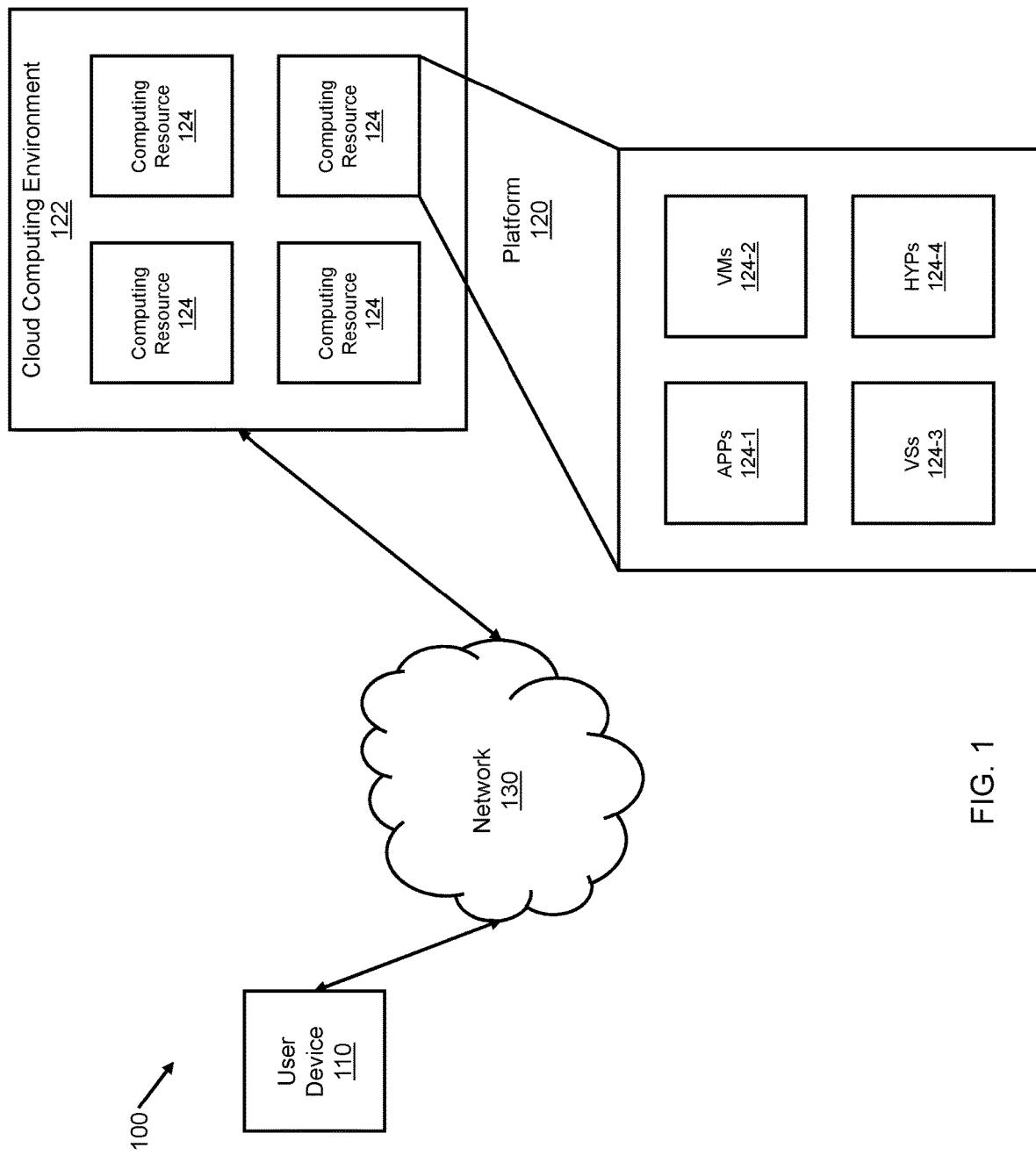
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
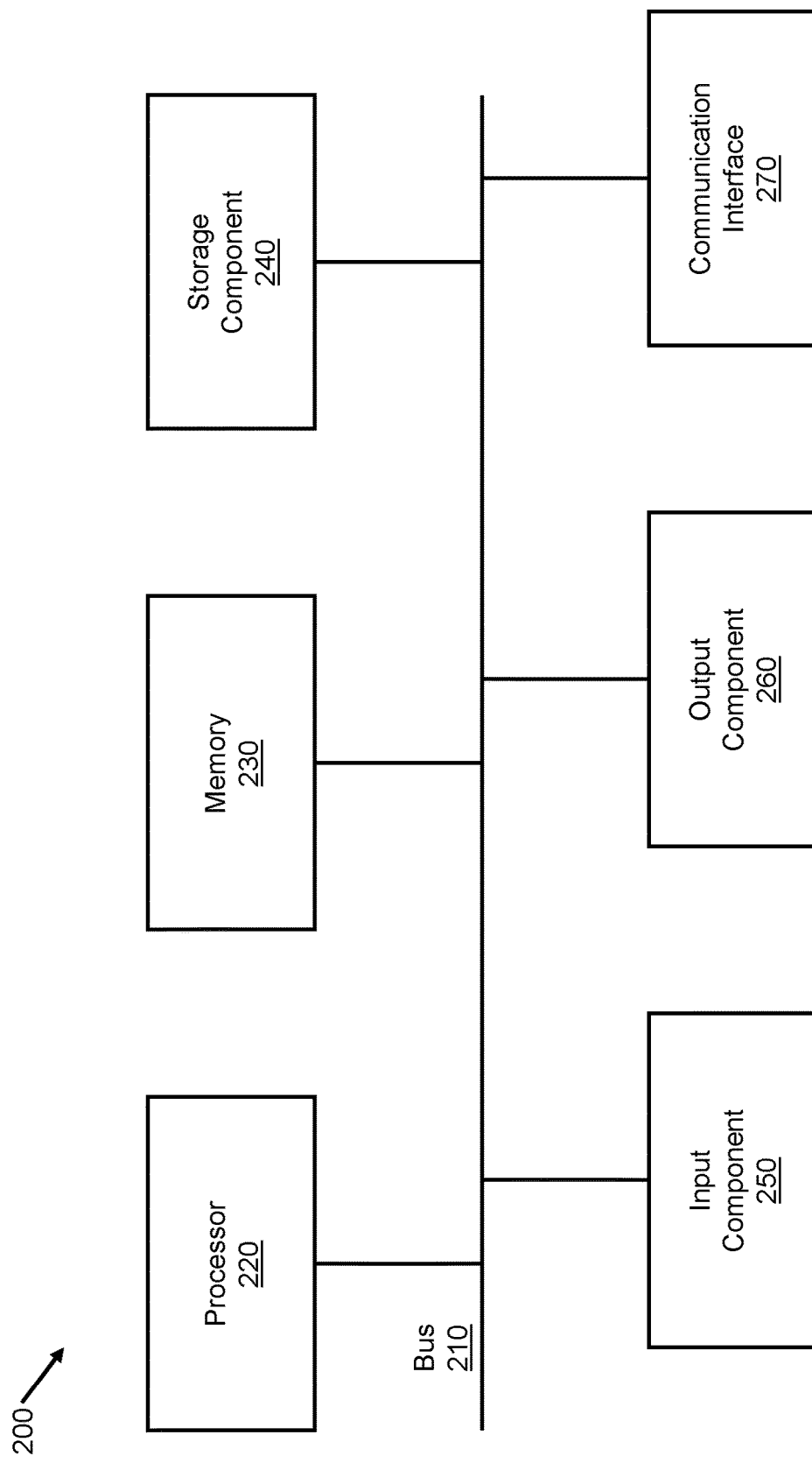
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A method and an apparatus for substitutional neural residual compression will now be described in detail.

The method and apparatus may improve an efficiency of DNN-based residual compression. For each image frame having a residual that is compressed by an E2E DNN, a substitutional residual is generated and can deliver better compression performance than an original residual.

Given a residual $r_t$ of a size (h,w,c), where h, w, c are height, width, and number of channels, respectively, E2E residual compression includes computing a compressed representation $\hat{y}_t$, from which a recovered residual $\hat{r}_t$ can be reconstructed. A distortion loss function $D(r_t, \hat{r}_t)$ is used to measure a reconstruction error (i.e., a distortion loss), such as Mean Squared Error (MSE) or Peak Signal-to-Noise Ratio (PSNR). A rate loss function $R(\hat{y}_t)$ is used to measure a bit consumption of the compressed representation $\hat{y}_t$. A trade-off hyperparameter is used to balance a joint Rate-Distortion (R-D) loss L:

$$L(r_t, \hat{r}_t, \hat{y}_t) = D(r_t, \hat{r}_t) + \lambda R(\hat{y}_t) \tag{1}$$

Training with a large trade-off hyperparameter λ results in compression models with less distortion but more bit consumption, and vice versa. To achieve different bitrates in practice, E2E residual compression methods may train multiple model instances, one for each target trade-off hyperparameter λ, and store all these model instances on both encoder and decoder sides. Embodiments described herein, however, provide an ability of a range of flexible bitrate control, without training and storing multiple model instances.

Figure 3:
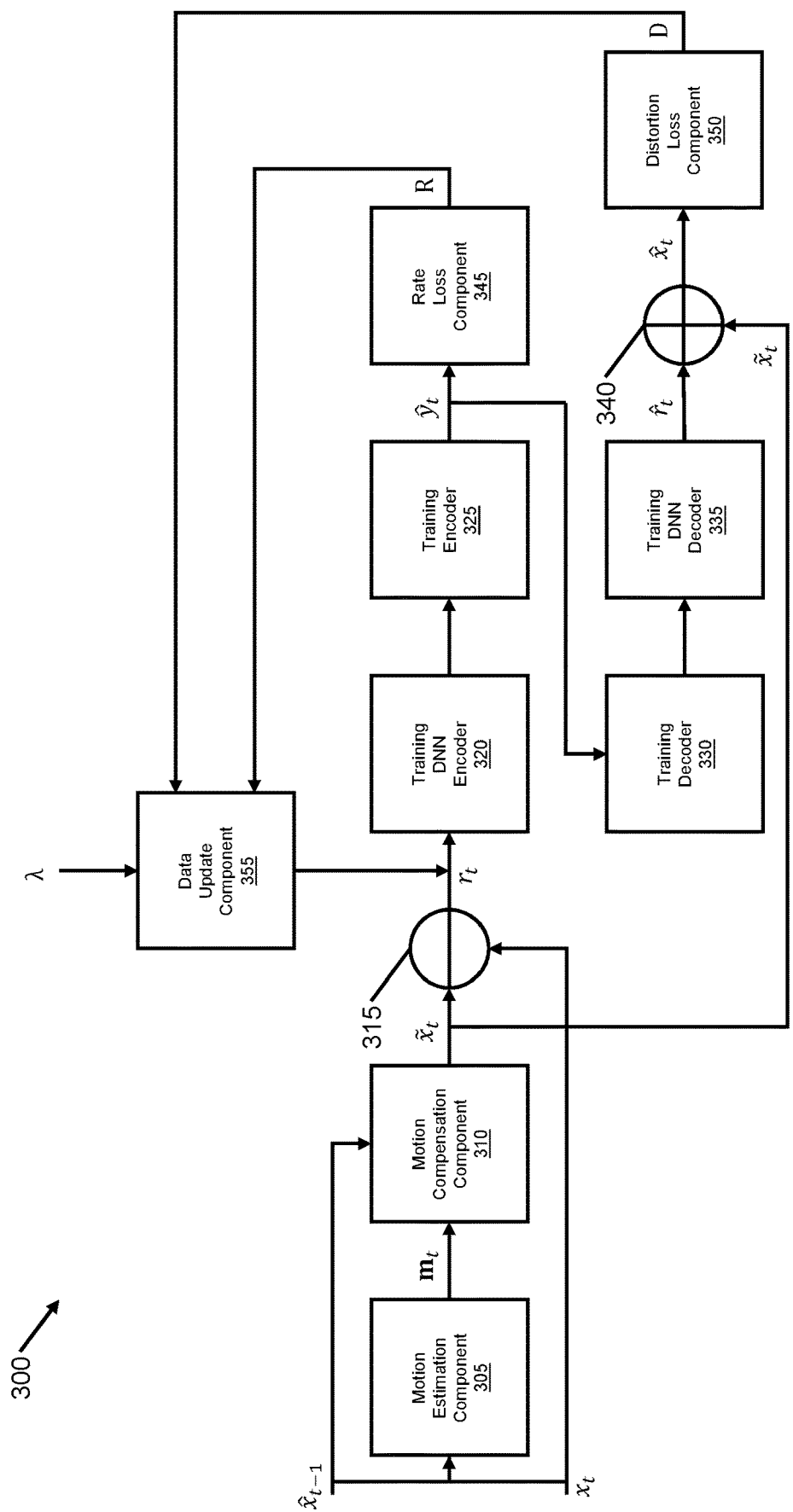
FIG. 3 is a block diagram of a training apparatus for substitutional neural residual compression, during a training stage, according to embodiments.
Figure 4:
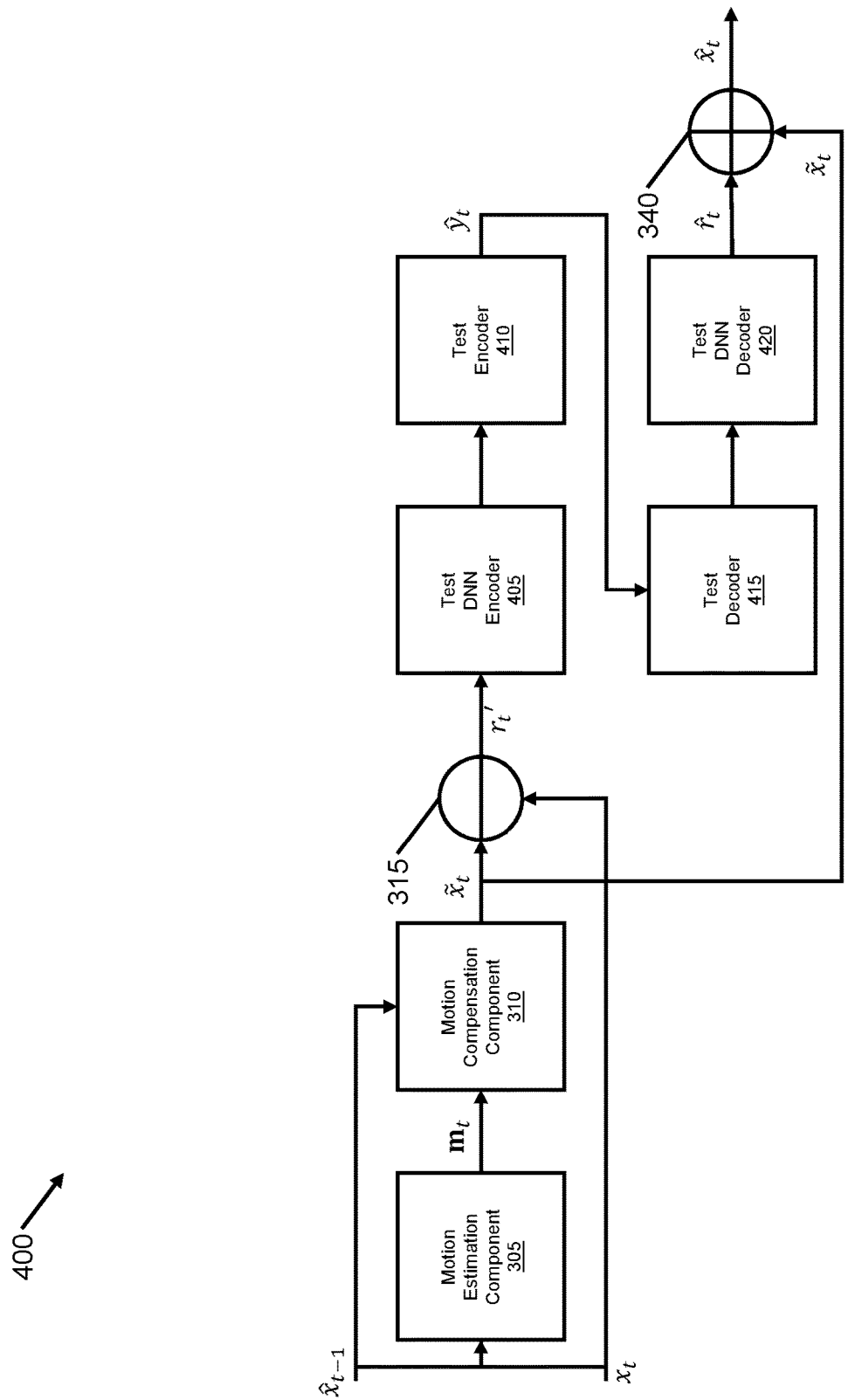
FIG. 4 is a block diagram of a testing apparatus for substitutional neural residual compression, during a test stage, according to embodiments.

FIGS. 3 and 4 provide an overall workflow of an encoder and a decoder, according to embodiments. There are two different stages: a training stage and a test stage.

FIG. 3 is a block diagram of a training apparatus 300 for substitutional neural residual compression, during a training stage, according to embodiments.

As shown in FIG. 3, the training apparatus 300 includes a motion estimation component 305, a motion compensation component 310, a subtractor 315, a training DNN encoder 320, a training encoder 325, a training decoder 330, a training DNN decoder 335, an adder 340, a rate loss component 345, a distortion loss component 350 and a data update component 355.

The goal of the training stage is to generate a substitutional residual $r_t'$ for each image frame $x_t$. Given a current image frame $x_t$ and a previous reconstructed image frame $\hat{x}_{t-1}$, the motion estimation component 305 obtains motion vectors $m_t$. The previous reconstructed image frame $\hat{x}_{t-1}$ may include a set of image frames. For instance, when the current image frame $x_t$ is a P frame, all of the previous reconstructed image frames $\hat{x}_{t-1}$ are before the current image frame $x_t$. When the current image frame $x_t$ is a B frame, the previous reconstructed image frames $\hat{x}_{t-1}$ contain image frames from both before and after the current image frame $x_t$. When the current frame $x_t$ is a low-delay B frame, the previous reconstructed image frames $\hat{x}_{t-1}$ are before the current image frame $x_t$. The motion estimation component 305 can use one or more blockwise motion estimators or DNN-based optical flow estimators.

The motion compensation component 310 obtains the predicted image frame $\tilde{x}_t$, based on the previous reconstructed image frame $x_{t-1}$ and the motion vectors $m_t$. In embodiments, one DNN can be used to simultaneously compute the motion vectors $m_t$ and the predicted image frame $\tilde{x}_t$.

The subtractor 315 obtains a residual $r_t$ between the original image frame $x_t$ and the predicted image frame $\tilde{x}_t$:
$r_t = x_t - \tilde{x}_t$.

Using the residual $r_t$ as input, the training DNN encoder 320 obtains a DNN-encoded representation, based on which the training encoder 325 obtains a compressed representation $\hat{y}_t$. The training DNN encoder 320 and the training encoder 325 are an encoder part of an E2E DNN encoder-decoder.

Based on the compressed representation $\hat{y}_t$, the training decoder 330 obtains an uncompressed representation, which is used as input to the training DNN decoder 335 to obtain a recovered residual $\hat{r}_t$. The training decoder 330 and the training DNN decoder 335 are a decoder part of the E2E DNN encoder-decoder.

In this disclosure, there are not any restrictions on network structures of the E2E DNN encoder-decoder, as long as it is learnable with gradient back-propagation. In embodiments, the training encoder 325 and the training decoder 330 use a differentiable statistic sampler to approximate an effect of real quantization and dequantization.

The adder 340 adds the recovered residual $\hat{r}_t$ back to the predicted image frame $x_t$ to obtain a reconstructed image frame $\hat{x}_t$: $\hat{x}_t = \tilde{x}_t + \hat{y}_t$.

In the training stage, the training DNN encoder 320 and the training DNN decoder 335 are first initialized, namely, model weights of the training DNN encoder 320 and the training DNN decoder 335 are set based on a predetermined DNN encoder and a predetermined DNN decoder.

Then, a retraining/finetuning process is conducted to compute the substitutional residual $r_t'$, so that an overall loss $L(r_t', \hat{r}_t, \hat{y}_t)$ of Equation (1) (where the substitutional residual $r_t'$ is used to replace the residual $r_t$) can be optimized or reduced.

In detail, the rate loss component 345 obtains a rate loss $R(\hat{y}_t)$, using a predetermined rate loss estimator. For example, an entropy estimation approach may be used for estimating the rate loss $R(\hat{y}_t)$.

The distortion loss component 350 obtains a distortion loss $D(r_t, \hat{r}_t)$, based on the reconstructed image frame $\hat{x}_t$.

The data update component 355 obtains gradients of the overall loss $L(r_t', \hat{r}_t, \hat{y}_t)$ to update the substitutional residual $r_t$ through backpropagation. This backpropagation process is iterated to continue updating the substitutional residual $r_t$ until a stopping criterion is reached, such as when the optimization converges or when a maximum number of iterations is reached.

In embodiments, weights of the predetermined DNN encoder, the predetermined DNN decoder and the predetermined rate loss estimator are pre-trained based on a set of pre-training data, where for each training image frame $x_t^{pre-train}$, the same processes are conducted to compute a residual $r_t^{pre-train}$, which is then passed through the same forward computation through DNN encoding, encoding, decoding, and DNN decoding to generate a compressed representation $\hat{y}_t^{pre-train}$ and a recovered residual $\hat{r}_t^{pre-train}$. Then, given a hyperparameter $\lambda^{pre-train}$, a pre-trained loss is obtained and includes both a rate loss and a distortion loss $L^{pre-train} (r_t^{pre-train}, \hat{r}_t^{pre-train}, \hat{y}_t^{pre-train})$ similar to Equation (1), whose gradients are used to update the weights of the predetermined DNN encoder, the predetermined DNN decoder and the predetermined rate loss estimator through iterative backpropagation. The pre-training dataset can be the same or different from a dataset based on which the training DNN encoder 320 and the training DNN decoder 335 were trained.

FIG. 4 is a block diagram of a testing apparatus 400 for substitutional neural residual compression, during a test stage, according to embodiments.

As shown in FIG. 4, the testing apparatus 400 includes the motion estimation component 305, the motion compensation component 310, the subtractor 315, a test DNN encoder 405, a test encoder 410, a test decoder 415, a test DNN decoder 420, and the adder 340.

In the test stage of an encoder (i.e., the test DNN encoder 405 and the test encoder 410), after learning a substitutional residual $r_t'$, it is passed through a forward inference process of the test DNN encoder 405 to generate a DNN-encoded representation, based on which the test encoder 410 obtains a final compressed representation $\hat{y}_t$.

Then, the test decoder 415 obtains an uncompressed representation, which is used as input of the test DNN decoder 420 to obtain a reconstructed residual $\hat{r}_t$.

In embodiments, the test DNN encoder 405 and the test DNN decoder 420 are the same with the training DNN encoder 320 and the training DNN decoder 335, respectively, while the test encoder 410 and the test decoder 415 are different from the training encoder 325 and the training decoder 330, respectively. As mentioned before, quantization and dequantization processes are replaced by a differentiable statistic sampler in the training encoder 325 and the training decoder 330. In the test stage, real quantization and dequantization are conducted in the test encoder 410 and test decoder 415, respectively. In this disclosure, there are no restrictions on quantization and dequantization methods that are used by the test encoder 410 and test decoder 415.

After reconstructing the reconstructed residual $\hat{r}_t$, the adder 340 adds the reconstructed residual $\hat{r}_t$ back to a predicted image frame $\tilde{x}_t$ to obtain a reconstructed image frame $\hat{x}_t$: $\hat{x}_t = \tilde{x}_t + \hat{r}_t$, and the testing apparatus 400 proceeds to process a next image frame $x_{t+1}$.

Both motion vectors $m_t$ and a compressed representation $\hat{y}_t$ may be sent to decoders. They may be further encoded into a bitstream through entropy coding.

In the test stage of a decoder (i.e., the test decoder 415 and the test DNN decoder 420), after obtaining the motion vectors $m_t$ and the compressed representation $\hat{y}_t$ (e.g., by decoding from the encoded bitstream), and given a previous reconstructed image frame $\hat{x}_{t-1}$, the test decoder 415 obtains an uncompressed representation of $\hat{y}_t$, based on which the test DNN decoder 420 obtains the reconstructed residual $\hat{r}_t$. In a motion compensation component on the decoder side, the predicted image frame $\tilde{x}_t$ is obtained based on the previous reconstructed image frame $\hat{x}_{t-1}$ and the motion vectors $m_t$, in the same way as the motion compensation component 310 on the encoder side. Then, the adder 340 adds the reconstructed residual $\hat{r}_t$ back to the predicted image frame $\tilde{x}_t$ to obtain the reconstructed image frame $\hat{x}_t$, and testing apparatus 400 proceeds to process the next image frame $\hat{x}_{t+1}$.

The above embodiments provide flexibility in bitrate control and target metric control. When a target bitrate of a compressed representation $\hat{y}_t$ is changed, only a hyperparameter $\lambda$ in a training stage of an encoding process described in FIG. 3 is changed, without retraining/finetuning the training DNN encoder 320, the training encoder 325, the training decoder 330, the training DNN decoder 335, the test DNN encoder 405, the test encoder 410, the test decoder 415 and the test DNN decoder 420. Similarly, to obtain a compressed residual that is optimal for different target metrics (e.g., PSNR or structural similarity (SSIM)) of the compressed representation $\hat{y}_t$, a way to obtain distortion loss in the training stage of the encoding process described in FIG. 3 is changed, without retraining/finetuning the training DNN encoder 320, the training encoder 325, the training decoder 330, the training DNN decoder 335, the test DNN encoder 405, the test encoder 410, the test decoder 415 and the test DNN decoder 420.

Figure 5:
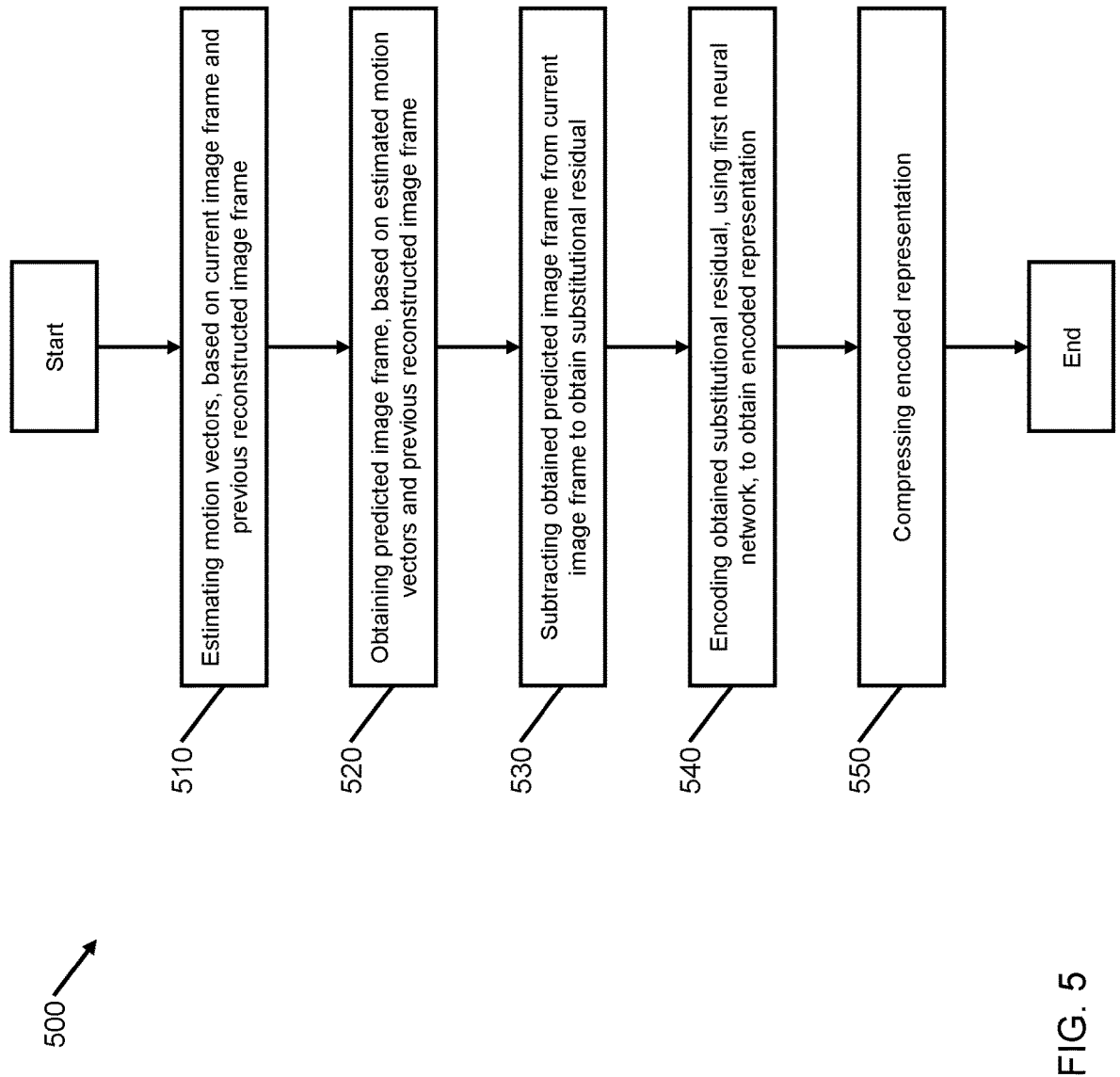
FIG. 5 is a flowchart of a method of substitutional neural residual compression, according to embodiments.

FIG. 5 is a flowchart of a method of substitutional neural residual compression, according to embodiments.

In some implementations, one or more process blocks of FIG. 5 may be performed by the platform 120. In some implementations, one or more process blocks of FIG. 5 may be performed by another device or a group of devices separate from or including the platform 120, such as the user device 110.

As shown in FIG. 5, in operation 510, the method 500 includes estimating motion vectors, based on a current image frame and a previous reconstructed image frame.

In operation 520, the method 500 includes obtaining a predicted image frame, based on the estimated motion vectors and the previous reconstructed image frame.

In operation 530, the method 500 includes subtracting the obtained predicted image frame from the current image frame to obtain a substitutional residual.

In operation 540, the method 500 includes encoding the obtained substitutional residual, using a first neural network, to obtain an encoded representation.

In operation 550, the method 500 includes compressing the encoded representation.

The estimating the motion vectors, the obtaining the predicted image frame, the obtaining the substitutional residual, the obtaining the encoded representation and the compressing the encoded representation may be performed by an encoding processor.

Although FIG. 5 shows example blocks of the method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel.

Figure 6:
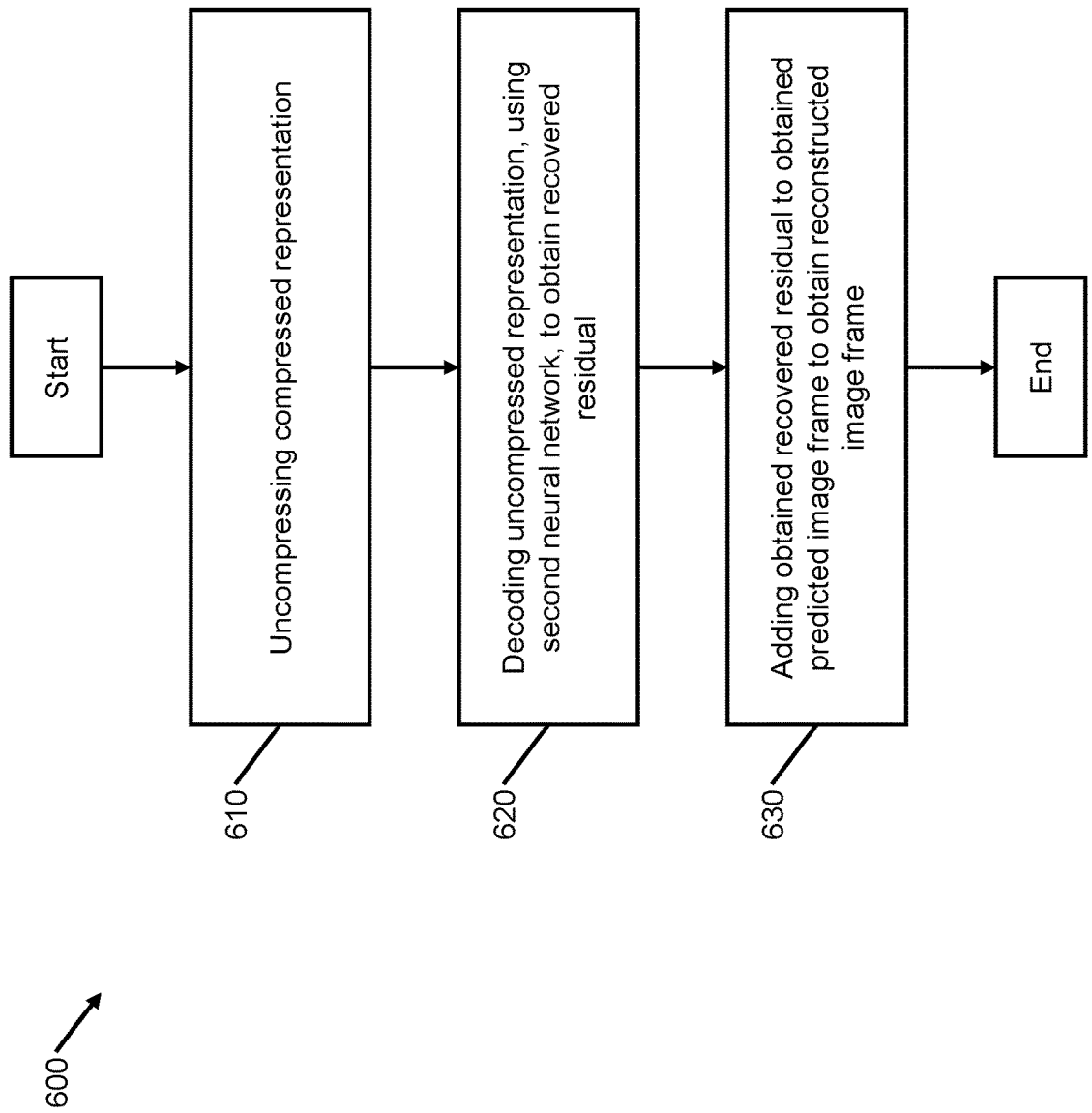
FIG. 6 is a block diagram of an apparatus for substitutional neural residual compression, according to embodiments.

FIG. 6 is a flowchart of a method of substitutional neural residual compression, according to embodiments.

In some implementations, one or more process blocks of FIG. 6 may be performed by the platform 120. In some implementations, one or more process blocks of FIG. 6 may be performed by another device or a group of devices separate from or including the platform 120, such as the user device 110.

As shown in FIG. 6, in operation 610, the method 600 includes uncompressing the compressed representation.

In operation 620, the method 600 includes decoding the uncompressed representation, using a second neural network, to obtain a recovered residual.

In operation 630, the method 600 includes adding the obtained recovered residual to the obtained predicted image frame to obtain a reconstructed image frame.

The first neural network and the second neural network may be trained by determining a distortion loss, based on the obtained recovered residual and the obtained substitutional residual, determining a rate loss, based on the compressed representation, determining a gradient of a rate-distortion loss, based on the determined distortion loss, the determined rate loss and a hyperparameter, and updating the obtained substitutional residual to reduce the determined gradient of the rate-distortion loss.

The hyperparameter may be set based on a target bitrate of the compressed representation, without retraining the first neural network and the second neural network.

The distortion loss may be determined based on a function that is set based on a type of a target metric of the compressed representation, without retraining the first neural network and the second neural network.

The uncompressing the compressed representation, the decoding the uncompressed representation and the obtaining reconstructed image frame may be performed by a decoding processor. The method may further include obtaining, by the decoding processor, the predicted image frame, based on the estimated motion vectors and the previous reconstructed image frame.

Although FIG. 6 shows example blocks of the method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel.

Figure 7:
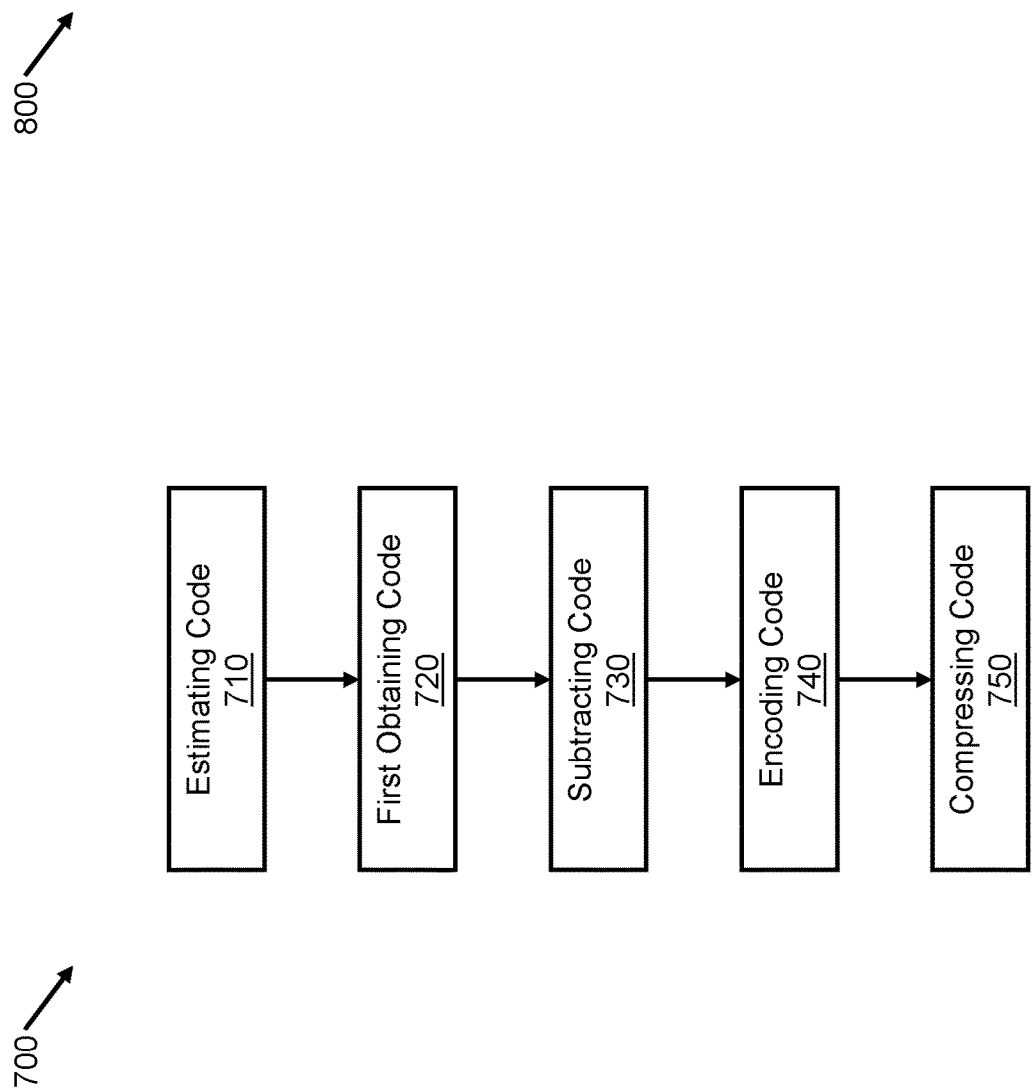
FIG. 7 is a flowchart of a method of substitutional neural residual compression, according to embodiments.

FIG. 7 is a block diagram of an apparatus 700 for substitutional neural residual compression, according to embodiments.

As shown in FIG. 7, the apparatus 700 includes estimating code 710, first obtaining code 720, subtracting code 730, encoding code 740 and compressing code 750.

The estimating code 710 is configured to cause at least one processor to estimate motion vectors, based on a current image frame and a previous reconstructed image frame.

The first obtaining code 720 is configured to cause the at least one processor to obtain a predicted image frame, based on the estimated motion vectors and the previous reconstructed image frame;

The subtracting code 730 is configured to cause the at least one processor to subtract the obtained predicted image frame from the current image frame to obtain a substitutional residual;

The encoding code 740 is configured to cause the at least one processor to encode the obtained substitutional residual, using a first neural network, to obtain an encoded representation; and The compressing code 750 is configured to cause the at least one processor to compress the encoded representation.

The estimating code, the first obtaining code, the subtracting code, the encoding code, and the compressing code may be configured to cause an encoding processor to perform functions.

Figure 8:
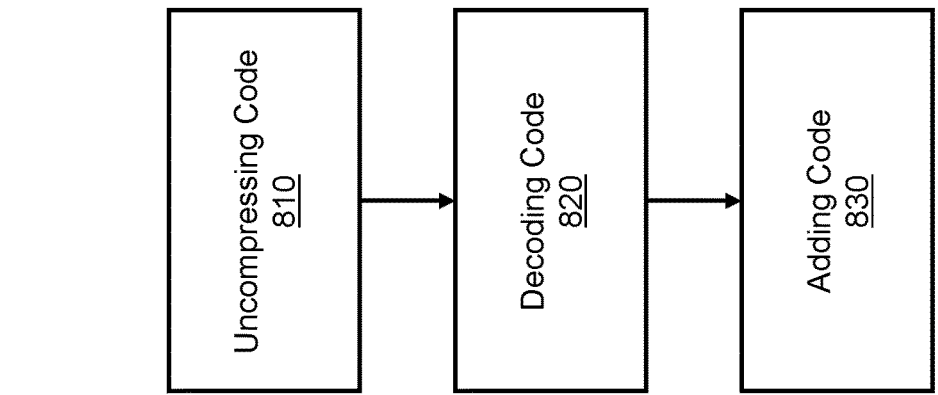
FIG. 8 is a block diagram of an apparatus for substitutional neural residual compression, according to embodiments.

FIG. 8 is a block diagram of an apparatus 800 for substitutional neural residual compression, according to embodiments.

As shown in FIG. 8, the apparatus 800 includes uncompressing code 810, decoding code 820 and adding code 830.

The uncompressing code 810 is configured to cause the at least one processor to uncompress the compressed representation;

The decoding code 820 is configured to cause the at least one processor to decode the uncompressed representation, using a second neural network, to obtain a recovered residual.

The adding code 830 is configured to cause the at least one processor to add the obtained recovered residual to the obtained predicted image frame to obtain a reconstructed image frame.

The first neural network and the second neural network may be trained by determining a distortion loss, based on the obtained recovered residual and the obtained substitutional residual, determining a rate loss, based on the compressed representation, determining a gradient of a rate-distortion loss, based on the determined distortion loss, the determined rate loss and a hyperparameter, and updating the obtained substitutional residual to reduce the determined gradient of the rate-distortion loss.

The hyperparameter may be set based on a target bitrate of the compressed representation, without retraining the first neural network and the second neural network.

The distortion loss may be determined based on a function that is set based on a type of a target metric of the compressed representation, without retraining the first neural network and the second neural network.

The uncompressing code 810, the decoding code 820 and the adding code 830 may be configured to cause a decoding processor to perform functions. The apparatus 800 may further include second obtaining code configured to cause the decoding processor to obtain the predicted image frame, based on the estimated motion vectors and the previous reconstructed image frame.

Comparing with previous video compression methods, the above embodiments have the following advantages. The embodiments can be treated as a general module that can be applied to any E2E residual compression DNN method. For each individual image frame, its substitutional residual may be optimized through an individual retraining/fine tuning process, based on a feedback of its loss, which can boost compression performance.

Further, the above embodiments can achieve flexible bitrate control, without retraining/finetuning an E2E residual compression model or using multiple models. The embodiments can also change a target compression metric without retraining/finetuning the E2E residual compression model.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of substitutional neural residual compression, the method being performed by at least one processor, and the method comprising:

estimating motion vectors, based on a current image frame and a previous reconstructed image frame;

obtaining a predicted image frame, based on the estimated motion vectors and the previous reconstructed image frame;

subtracting the obtained predicted image frame from the current image frame to obtain a substitutional residual;

encoding the obtained substitutional residual, using a first neural network, to obtain an encoded representation; and compressing the encoded representation, wherein the first neural network is trained by updating the obtained substitutional residual to reduce a determined gradient of rate-distortion loss.

2. The method of claim 1, further comprising:
uncompressing the compressed representation;
decoding the uncompressed representation, using a second neural network, to obtain a recovered residual; and
adding the obtained recovered residual to the obtained predicted image frame to obtain a reconstructed image frame.

3. The method of claim 2, wherein the first neural network and the second neural network are trained by:
determining the distortion loss, based on the obtained recovered residual and the obtained substitutional residual;
determining a rate loss, based on the compressed representation; and
determining the gradient of the rate-distortion loss, based on the determined distortion loss, the determined rate loss and a hyperparameter.

4. The method of claim 3, wherein the hyperparameter is set based on a target bitrate of the compressed representation, without retraining the first neural network and the second neural network.

5. The method of claim 3, wherein the distortion loss is determined based on a function that is set based on a type of a target metric of the compressed representation, without retraining the first neural network and the second neural network.

6. The method of claim 1, wherein the estimating the motion vectors, the obtaining the predicted image frame, the obtaining the substitutional residual, the obtaining the encoded representation and the compressing the encoded representation are performed by an encoding processor.

7. The method of claim 6, further comprising:
uncompressing, by a decoding processor, the compressed representation;
decoding, by the decoding processor, the uncompressed representation, using a second neural network, to obtain a recovered residual;
obtaining, by the decoding processor, the predicted image frame, based on the estimated motion vectors and the previous reconstructed image frame; and
adding, by the decoding processor, the obtained recovered residual to the obtained predicted image frame to obtain a reconstructed image frame.

8. An apparatus for substitutional neural residual compression, the apparatus comprising:
at least one memory configured to store program code; and
at least one processor configured to read the program code and operate as instructed by the program code, the program code comprising:
estimating code configured to cause the at least one processor to estimate motion vectors, based on a current image frame and a previous reconstructed image frame;
first obtaining code configured to cause the at least one processor to obtain a predicted image frame, based on the estimated motion vectors and the previous reconstructed image frame;
subtracting code configured to cause the at least one processor to subtract the obtained predicted image frame from the current image frame to obtain a substitutional residual;
encoding code configured to cause the at least one processor to encode the obtained substitutional residual, using a first neural network, to obtain an encoded representation; and
compressing code configured to cause the at least one processor to compress the encoded representation,
wherein the first neural network is trained by updating the obtained substitutional residual to reduce a determined gradient of rate-distortion loss.

9. The apparatus of claim 8, wherein the program code further comprises:
uncompressing code configured to cause the at least one processor to uncompress the compressed representation;
decoding code configured to cause the at least one processor to decode the uncompressed representation, using a second neural network, to obtain a recovered residual; and
adding code configured to cause the at least one processor to add the obtained recovered residual to the obtained predicted image frame to obtain a reconstructed image frame.

10. The apparatus of claim 9, wherein the first neural network and the second neural network are trained by:
determining a distortion loss, based on the obtained recovered residual and the obtained substitutional residual;
determining a rate loss, based on the compressed representation; and
determining a gradient of a rate-distortion loss, based on the determined distortion loss, the determined rate loss and a hyperparameter.

11. The apparatus of claim 10, wherein the hyperparameter is set based on a target bitrate of the compressed representation, without retraining the first neural network and the second neural network.

12. The apparatus of claim 10, wherein the distortion loss is determined based on a function that is set based on a type of a target metric of the compressed representation, without retraining the first neural network and the second neural network.

13. The apparatus of claim 8, wherein the estimating code, the first obtaining code, the subtracting code, the encoding code, and the compressing code are configured to cause an encoding processor to perform functions.

14. The apparatus of claim 13, wherein the program code further comprises:
uncompressing code configured to cause a decoding processor to uncompress the compressed representation;
decoding code configured to cause the decoding processor to decode the uncompressed representation, using a second neural network, to obtain a recovered residual;
second obtaining code configured to cause the decoding processor to obtain the predicted image frame, based on the estimated motion vectors and the previous reconstructed image frame; and
adding code configured to cause the decoding processor to add the obtained recovered residual to the obtained predicted image frame to obtain a reconstructed image frame.

15. A non-transitory computer-readable medium storing instructions that, when executed by at least one processor for substitutional neural residual compression, cause the at least one processor to:
estimate motion vectors, based on a current image frame and a previous reconstructed image frame;
obtain a predicted image frame, based on the estimated motion vectors and the previous reconstructed image frame;

subtract the obtained predicted image frame from the current image frame to obtain a substitutional residual;

encode the obtained substitutional residual, using a first neural network, to obtain an encoded representation; and compress the encoded representation, wherein the first neural network is trained by updating the obtained substitutional residual to reduce a determined gradient of rate-distortion loss.

16. The non-transitory computer-readable medium of claim 15, wherein the instructions that, when executed by the at least one processor, further cause the at least one processor to:

uncompress the compressed representation;

decode the uncompressed representation, using a second neural network, to obtain a recovered residual; and add the obtained recovered residual to the obtained predicted image frame to obtain a reconstructed image frame.

17. The non-transitory computer-readable medium of claim 16, wherein the first neural network and the second neural network are trained by:

determining a distortion loss, based on the obtained recovered residual and the obtained substitutional residual;

determining a rate loss, based on the compressed representation;

determining a gradient of a rate-distortion loss, based on the determined distortion loss, the determined rate loss and a hyperparameter.

18. The non-transitory computer-readable medium of claim 17, wherein the hyperparameter is set based on a target bitrate of the compressed representation, without retraining the first neural network and the second neural network.

19. The non-transitory computer-readable medium of claim 17, wherein the distortion loss is determined based on a function that is set based on a type of a target metric of the compressed representation, without retraining the first neural network and the second neural network.

20. The non-transitory computer-readable medium of claim 15, wherein the instructions that, when executed by an encoding processor, cause the encoding processor to perform the estimating the motion vectors, the obtaining the predicted image frame, the obtaining the substitutional residual, the obtaining the encoded representation and the compressing the encoded representation, and the instructions that, when executed by a decoding processor, cause the decoding processor to:

uncompress the compressed representation;

decode the uncompressed representation, using a second neural network, to obtain a recovered residual;

obtain the predicted image frame, based on the estimated motion vectors and the previous reconstructed image frame; and add the obtained recovered residual to the obtained predicted image frame to obtain a reconstructed image frame.

* * * * *